US006740893B1

(12) United States Patent
Tanabe

(10) Patent No.: US 6,740,893 B1
(45) Date of Patent: May 25, 2004

(54) OPTICAL INSTRUMENT, AND DEVICE MANUFACTURING METHOD

(75) Inventor: Masayuki Tanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 09/678,255

(22) Filed: Oct. 3, 2000

(30) Foreign Application Priority Data

Oct. 4, 1999 (JP) .......................................... 11-283569

(51) Int. Cl.[7] ............................ G21G 5/00; G01J 1/00; G01J 1/42

(52) U.S. Cl. ............................... 250/492.2; 250/492.1; 250/372; 250/373; 250/503.1; 250/504 R

(58) Field of Search .......................... 250/492.2, 492.1, 250/372, 373, 503.1, 504 R; 356/239.1, 239.2, 239.5, 239.6, 239.8

(56) References Cited

U.S. PATENT DOCUMENTS 4,155,651 A * 5/1979 Malone ...................... 356/342
4,835,785 A * 5/1989 Thayer ........................ 372/58
5,146,098 A * 9/1992 Stack ...................... 250/492.2
5,166,530 A * 11/1992 McCleary ................ 250/492.2
5,204,530 A * 4/1993 Chastagner ................. 250/281
5,315,793 A * 5/1994 Peterson et al. ............... 451/2
5,652,431 A * 7/1997 DeSisto et al. ............. 250/373
5,685,895 A * 11/1997 Hagiwara et al. ............. 96/117
5,769,791 A * 6/1998 Benaron et al. ............ 600/473
5,772,597 A * 6/1998 Goldberger et al. ........ 600/473
5,807,261 A * 9/1998 Benaron et al. ............ 600/473
5,959,297 A * 9/1999 Weinberg et al. ........... 250/288
6,175,111 B1 * 1/2001 Sorita et al. ................ 250/282
6,268,904 B1 * 7/2001 Mori et al. .................... 355/53
6,288,769 B1 * 9/2001 Akagawa et al. ............. 355/30
6,496,248 B2 * 12/2002 Tanaka ........................ 355/72
2001/0051118 A1 * 12/2001 Mosso et al. ............... 422/186
2001/0055099 A1 * 12/2001 Akagawa et al. ............. 355/30
2001/0055101 A1 * 12/2001 Hayashi ....................... 355/53
2002/0000519 A1 * 1/2002 Tsukamoto .............. 250/492.1
2002/0026260 A1 * 2/2002 Tomita ....................... 700/121
2002/0074635 A1 * 6/2002 Hattoei et al. .............. 257/678
2002/0075469 A1 * 6/2002 Tanaka ........................ 355/72
2002/0109826 A1 * 8/2002 Akagawa et al. ............. 355/53
2002/0148981 A1 * 10/2002 Biro et al. ............... 250/515.1

FOREIGN PATENT DOCUMENTS

EP 0456202 A2 * 11/1991 .......... G01N/21/53
JP 08-055774 2/1996
JP 11-087230 3/1999
JP WO 02/052345 A1 * 12/2002 ............. G03F/1/08

OTHER PUBLICATIONS

Wang BioMedical, dated Feb. 3, 1998, http://wangbiomed-.com/sclean.htm.*
ORIEL Instruments, Optical Cleaning Supplies, http://www.oriel.com/netcat/VolumeIII/Descrippage/v3t6mat.htm.*
Edmund Industrial Optics, Teh Importance of Cleaning Optics, http://www.edmundoptics.co...upport/DisplayArticle.cfm?articleid=265.*
NASA Practice No. PD–ED–1233, Contamination Control Program.*

* cited by examiner

*Primary Examiner*—John R. Lee
*Assistant Examiner*—Bernard E. Souw
(74) *Attorney, Agent, or Firm*—Fitzpatrick, Cella, Harper & Scinto

(57) ABSTRACT

An optical instrument includes an optical element and a detector for detecting an impurity concentration in an ambience containing a space surrounding the optical element. By controlling the impurity concentration on the basis of an output of the detector, deposition of impurities on the optical element and deterioration of the optical characteristic of the optical element thereby can be prevented effectively.

47 Claims, 3 Drawing Sheets

OPTICAL INSTRUMENT, AND DEVICE MANUFACTURING METHOD

FIELD OF THE INVENTION AND RELATED ART

This invention relates to an optical instrument and a device manufacturing method. More particularly, the invention concerns an optical instrument suitably usable in an exposure apparatus or a spectroscope, for example, which uses light of a wavelength in an ultraviolet region as a light source and which has a function for preventing contamination of an optical element provided therewithin. Also, the invention concerns a device manufacturing method using such optical instrument.

As regards light sources of optical instruments, recently, shortening of the wavelength of light has been required. Currently, in place of standard ultraviolet rays, deep ultraviolet rays, X-rays and EUV, for example, are used. Generally, the shorter the wavelength is, the larger the optical energy thereof is. For example, photon energies of excimer lasers are 114.1 Kcal/mol (KrF excimer laser of a wavelength 248 nm), 147.2 Kcal/mol (ArF excimer laser of 193 nm), and 180.1 Kcal/mol ($F_2$ laser of 157 nm). As compared therewith, the binding and dissociation energy of molecule is, for example, 84 Kcal/mol (C—C bond). Namely, photon energies in this wavelength region correspond to binding and dissociation energies of various substances. Thus, when a substance is irradiated with a photon energy, there occurs optical absorption or opto-chemical reaction.

On the basis of such property, light of such wavelength region can be used to process a substance. Also, because the optical characteristic such as absorption or reflection differs with a substance, it can be used for the structure analysis of a substance. Thus, light in such wavelength region is used in a lithographic process, a CVD process, and an etching process, and in various measurement instruments.

In such wavelength region, particularly, a wavelength region not longer than 220 nm, however, oxygen absorbs light. This is because, with the shortening of the wavelength, the photon energy becomes larger and there occurs light absorption by oxygen. In consideration of it, in optical instruments using light of such wavelength region, the light path of an optical system is kept at vacuum or is filled with an inactive gas to prevent absorption by oxygen. The absorption of light is caused not only by oxygen but also by various substances. Further, there may occur decomposition or composition of a substance by any opto-chemical reaction.

Therefore, a substance deposited on an optical element such as a lens, a mirror, a mask or a reticle, for example, may cause light absorption.

Also, a substance produced by an opto-chemical reaction may be deposited on an optical element and may cause deterioration of its optical characteristic. In order to prevent such inconveniences, conventionally, an inactive gas to be supplied is kept at a high purity, or a filter for moving impurities (taking inorganic ion sulfate or ammonia as impurities) is mounted, for example.

Ammonium sulfate which is a typical contaminating substance is produced from sulfate ions and ammonium ions. The source of them may be those originally contained in an ambience gas of the optical instrument or those produced from the surface of a member. Further, it has been reported that, where water vapors are contained in a nitrogen gas ambience, irradiation of ultraviolet rays causes creation of ammonia. Also, it has been reported that an optical element may be contaminated by deposition of silicon oxide caused by an organic silicon compound.

The deterioration of optical characteristics of an optical element by deposition of a substance on its surface becomes more serious as the wavelength of a light source is shortened.

This is because, first, even if a substance deposited on an optical element does not adversely affect the optical characteristic thereof in a wavelength range from a visible region to a standard ultraviolet region, the same substance can absorb light of a shorter wavelength and apply an adverse effect to the optical characteristic.

Further, as the photon energy becomes stronger, an optochemical reaction attributable to a substance which is present on a light path may be promoted.

In consideration of the above, when light of a shorter wavelength is used, not only ion sulfate, ammonia and organic silicon compound but also many organic substances to which attentions have not been paid heretofore should be considered as factors for deteriorating the optical characteristic, and appropriate measures should be taken thereto.

From the standpoint of preventing contamination of an optical element, desirably all the impurities in an optical instrument should be removed. Practically, however, there are impurities in a gas from a supply source and, additionally, degassing may occur from a component of an optical instrument or a gas supply unit.

A factor to be considered in practice in relation to contamination of optical elements of an optical instrument due to deposition of impurities is the density or concentration of impurities in each portions surrounding the optical elements, which may cause deposit contamination substances.

Therefore, not only the purity of a gas from a supply source but also matters decomposed from components of the optical instrument or a gas supply line, for example, should be considered from the standpoint of impurities, and it is necessary to design a contamination-free environment. The impurity production due to these factors is not constant. If there occurs deterioration of or defect in a component, the impurity concentration in the optical instrument will increase due to matters decomposed from the component, causing contamination of optical elements.

SUMMARY OF THE INVENTION

It is an object of the present invention to provide an optical instrument by which contamination of an optical element due to deposition of impurities can be reduced.

It is another object of the present invention to provide a device manufacturing method using such optical instrument.

There may be various impurities inside an optical instrument. Among them, particularly to those which may be deposited on an optical element to cause deterioration of its optical characteristic, the density or concentration thereof should desirably be defined and the density inside the optical instrument should preferably be monitored and controlled. The impurity density in the ambience and the density of being deposited and accumulated on the surface of an optical element are at a certain proportion, for each substance, and are in a balanced state. Therefore, for suppressing deposition thereof on the surface of an optical element, it is necessary to decrease the impurity density or concentration in the ambience of the optical instrument and also to monitor and control the concentration.

In accordance with an aspect of the present invention, there is provided an optical instrument, comprising: an optical element; and a detector for detecting an impurity concentration in an ambience containing a space surrounding the optical element.

In accordance with another aspect of the present invention, there is provided an optical, instrument, comprising: an optical element; a detector for detecting an impurity concentration in an ambience containing a space surrounding the optical element; and means for producing information of impurity concentration on the basis of an output of said detector.

In accordance with a further aspect of the present invention, there is provided an optical instrument, comprising: an optical element; a detector for detecting an impurity concentration in an ambience containing a space surrounding the optical element; and means for informing an abnormal concentration on the basis of an output of said detector.

In accordance with a yet further aspect of the present invention, there is provided an optical instrument, comprising: an optical element; a detector for detecting an impurity concentration in an ambience containing a space surrounding the optical element; and a controller for controlling said optical element on the basis of an output of said detector.

In these aspects of the present invention, the optical instrument may further comprise means for putting the ambience in a state purged with a gas substantially not absorbing light to be propagated through the optical element.

The gas may comprise a dry air or an inactive gas such as a nitrogen gas and a helium gas.

The light may comprise deep ultraviolet rays having a wavelength not longer than 200 nm.

The inactive gas may comprise a helium gas.

The light may comprise deep ultraviolet rays having a wavelength of about 248 nm.

The optical instrument may further comprise an excimer laser as a light source for producing the light.

The optical instrument may be an exposure apparatus including (i) means for holding one of a mark and a reticle (ii) an illumination optical system for illuminating a pattern of the mask or the reticle with the light, and (iii) means for holding a wafer to be exposed with the pattern. Also, the optical instrument may further comprise a projection optical system for projecting the pattern onto the wafer with use of the light, wherein said projection optical system is provided by (i) refractive elements only, (ii) reflective elements only, or (iii) a combination of refractive and reflective elements.

The detector may have a sensor for detecting a concentration of an organic substance.

The concentration of the organic substance may be controlled so that the total amount of organic substance in a gas inside said optical instrument becomes not greater than 1 $\mu g/m^3$.

The concentration of the organic substance may be controlled so that each concentration of carboxylic acids, aldehydes, esters, phenols, phtalates, phthalic acids, amines, and amides is kept at 0.01 $\mu g/m^3$ or less.

In accordance with a still further aspect of the present invention, there is provided a device manufacturing method, comprising the steps of: exposing a wafer with a device pattern by use of an optical instrument as recited above; and developing the exposed wafer.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In accordance with the present invention, substances which are present in an ambience and which may cause contamination of optical elements can be reduced as much as possible, so that deterioration of optical characteristics due to the contamination can be suppressed.

In an embodiment of the present invention, the impurity concentration in a gas is measured at a gas outlet port of an optical instrument. This enables monitoring the impurity concentration in the gas inside the optical instrument, while taking into account matters decomposed from components of the instrument. Further, the impurity concentration may be measured at a gas inlet port through which a gas is introduced into the optical instrument. By comparing the impurity concentrations at the gas outlet port and the gas inlet port with each other, the concentration of impurities produced inside the optical instrument can be detected. Since any local temperature inside the optical instrument or a gas flowing speed therein may apply an influence on the decomposition of impurities from a component thereof, local impurity concentration monitoring may preferably be made at one or plural locations inside the optical instrument. For example, in a high-temperature ambience, decomposition of a substance easily occurs from a component and, therefore, the impurity concentration increases. Further, at a place where the gas flow is stagnant, the impurity concentration will increase. Therefore, it is desirable to monitor the impurity concentration at such places.

Where a sensor which is based on a non-dispersion infrared absorption method or a hydrogen flame ionization detection method, for example, is mounted, the impurity concentration in the gas can be monitored continuously while the optical instrument is kept in operation. Also, if it is sure that, at different locations inside the optical instrument, the impurity concentration in the gas changes small, the concentration measurement may be made periodically through GC/MS or the like. This enables stable operation of the optical instrument.

If the impurity concentration being monitored becomes higher than a predetermined level, in order to meet it, an output of a concentration sensor may be applied to a controller by which various controls may be done. An example of control is stopping the operation and adjusting the gas flowrate. Alternatively, a washing operation using an opto-chemical reaction or ozones may be made to decrease the impurity concentration.

Next, the results of measurement made to changes in transmission factor of a quartz placed in an environment, in relation to an embodiment of the present invention, will be described.

Figure 1:
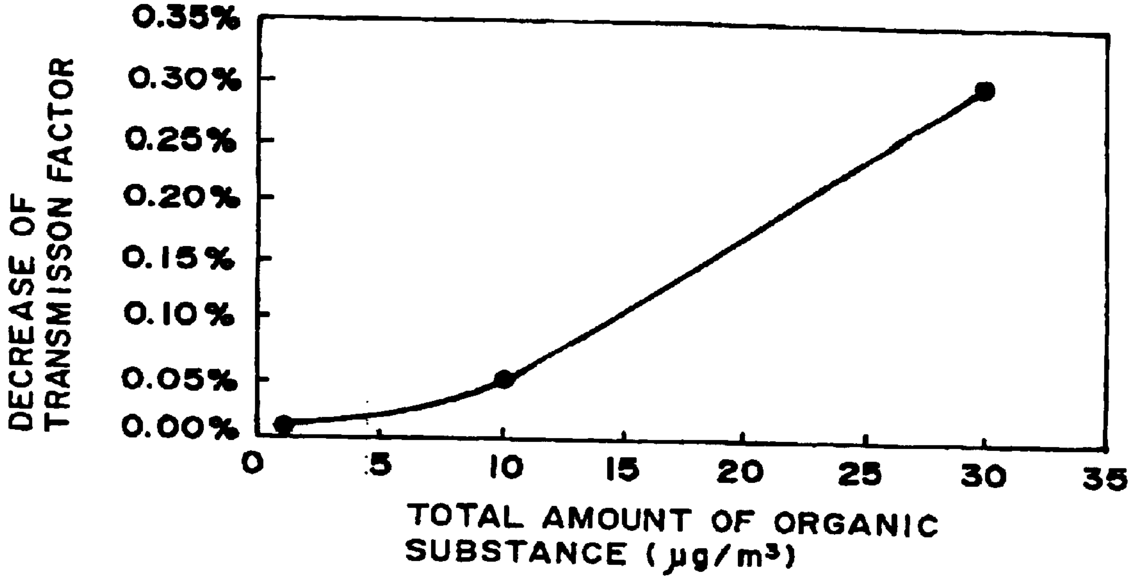
FIG. 1 is a graph for explaining the relationship between the total amount of organic substance as measured by GC/MS and deterioration of a transmission factor or quartz at 193 nm in one month.

The concentration of organic substances in the environment was measured by using a GC/MS heating desorption method. FIG. 1 shows the relation between the organic substance concentration (toluene conversion) in the ambience as measured by the GC/MS heating desorption method and the degree of deterioration of the transmission factor of the quartz with respect to light of a wavelength 193 nm.

If the organic substance concentration is high, there occurs substance deposition on the quartz surface, and it causes contamination thereof and decreases the transmission factor. However, where the quartz is kept in an environment wherein the organic substance concentration is decreased, the transmission factor decrease is suppressed. Further, depending on each substances and in accordance with their vapor pressures and polarities, attraction of them to the surface is different. A quartz was placed in an environment ambience and organic substances in the environment as well as organic substances deposited on the surface of the quartz were measured on the basis of the GC/MS heating desorption method. The results showed that there were different tendencies in detected organic substances. While many hydrocarbons were present in the environment ambience, on the other hand there were much carboxylic acids and phtalates deposited on the quartz surface more than hydrocarbons.

Thus, carboxylic acids, aldehydes, esters, phenols, phtalates phthalic acids, amines, and amides, for example, have functional groups with a high polarity such an carboxyl group, aldehyde group, ester group, phenyl group, and amino group, for example, and they are easily deposited on the surface of an optical element. When concentrations of these substances in the environment ambience were held low, deterioration of the optical characteristic was suppressed.

Thus, it has been confirmed that, in order to prevent deterioration of the optical characteristic of optical elements in an optical instrument, the organic substance concentration inside the instrument should be adjusted as follows.

Namely, the total amount of organic substances is held not greater than 1 $\mu g/m^3$, and carboxylic acids, aldehydes, esters, phenols, phtalates phthalic acids, amines, and amides should be kept at 0.01 $\mu g/m^3$ or less.

When this is done, deterioration of optical characteristic of an optical element due to contamination thereof can be prevented or suppressed effectively.

Preferred embodiments of the present invention will now be described.

Figure 2:
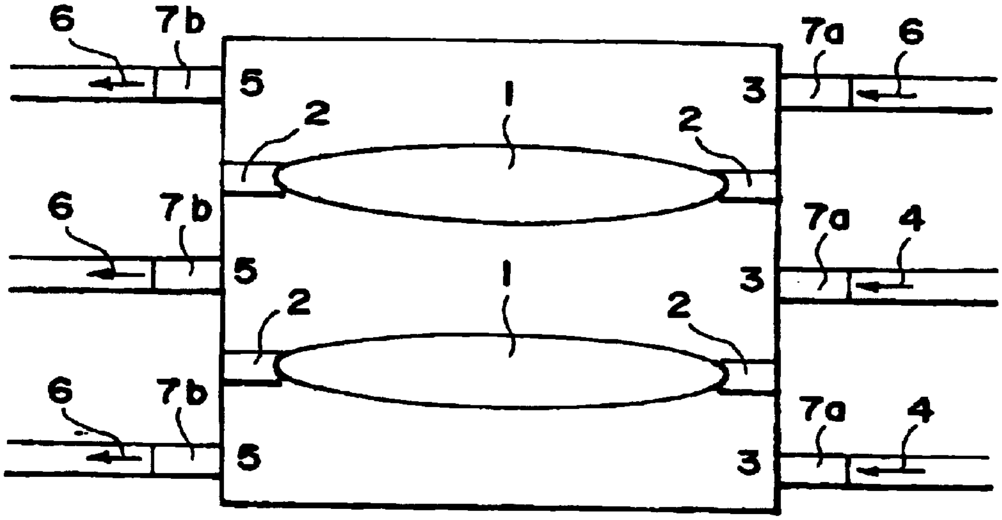
FIG. 2 is a schematic view of an arrangement including an optical element, in an embodiment wherein the present invention is applied to an exposure apparatus.

In relation to all gas-purged spaces including an optical element in a projection exposure apparatus (e.g., the inside space of a barrel of an illumination optical system or the inside space of a barrel of a projection optical system) the impurity concentration may be measured. FIG. 2 shows a general structure. As for the purging, a clean dry air or an inactive gas such as $N_2$ gas or He gas, for example, may be used. As regards components used in a gas supply unit and in the exposure apparatus, those materials causing smallest degassing are selected. Also, if necessary, a filter or the like is mounted. The organic substance (impurity) concentration is monitored by means of sensors 7*a* and 7*b*. These sensors may be of the type based on the non-dispersion infrared absorption method or the hydrogen flame ionization detection method, for example, and they are operable to perform continuous measurement. The sensors 7*a* are mounted at gas inlet ports 3, and the sensors 7*b* are mounted at gas outlet ports 5. From differences in the concentrations detected by them, the impurity concentration produced inside the instrument can be detected continuously.

As described above, by providing plural sensors at different locations inside the optical instrument and by comparing the detected impurity concentrations while taking into account the flows of gases, flowing through the instrument, a particular place, if any, where the impurity concentration becomes higher can be specified.

The impurity concentration measurement way be made periodically in accordance with the GC/MS measurement.

Figure 3:
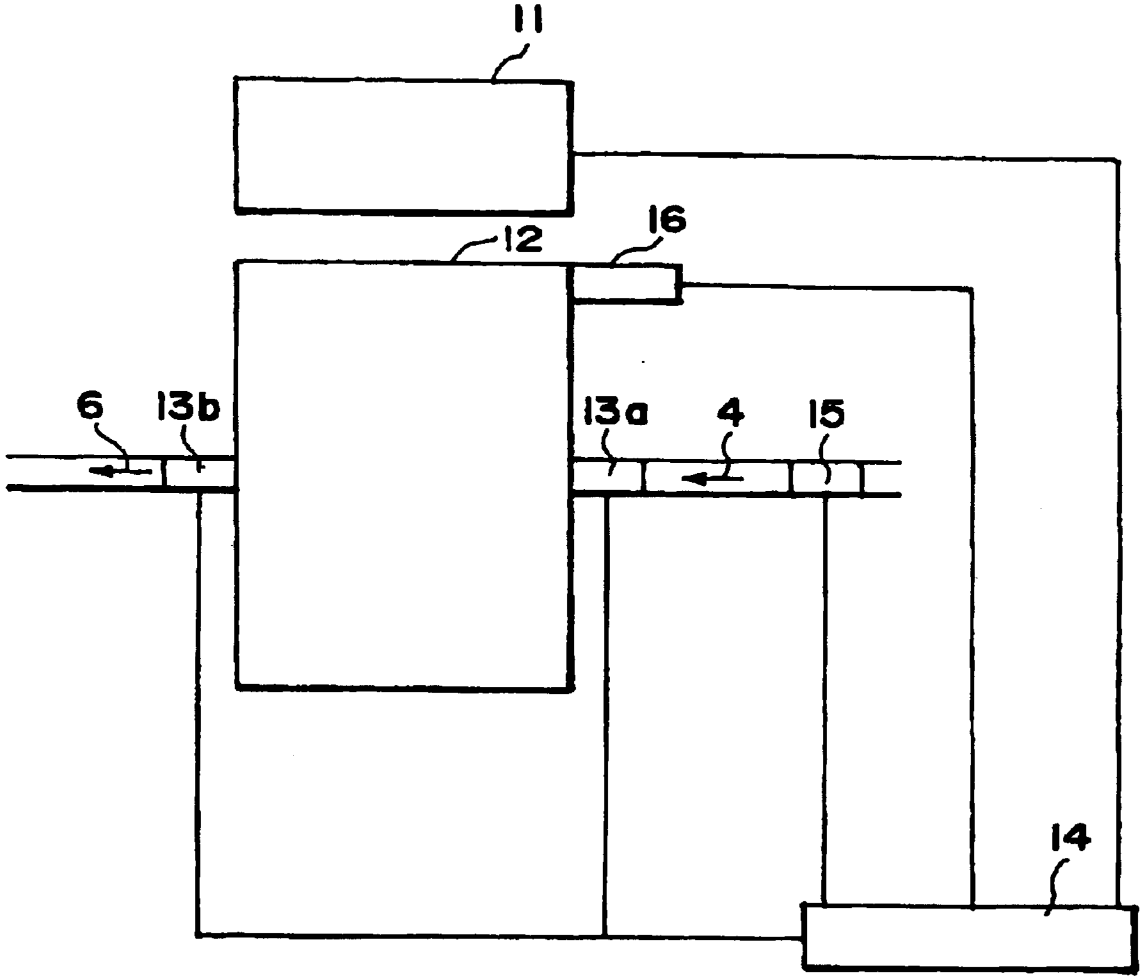
FIG. 3 is a schematic view of an arrangement including a control unit, in an embodiment wherein the present invention is applied to an pressure apparatus.

FIG. 3 illustrates a general structure including an impurity concentration controlling function. The impurity concentration as measured by a sensor means 13 (13*a* and 13*b*) is outputted to a controller 11. In the controller 11, the measured concentration is compared with a predetermined value. If the measured concentration becomes higher than the predetermined value, the controller 11 applies a control signal to relevant units. The operation of a light source 8 may be stopped, which is effective to prevent deposition of substances on the surface of an optical element such as a lens, a mirror, a reticle or a mask, as produced by an opto-chemical reaction of causal matters, i.e., impurities in the gas.

If the impurity concentration measured by the sensor 13*a* at the gas inlet port side becomes higher than that measured by the sensor 13*b* at the gas outlet port side, it means that the gas 4 being supplied or a gas supply unit supplying the gas involves its cause. Therefore, the gas or the gas supplying unit may preferably be replaced by another.

If the impurity concentration measured by the sensor 13*b* at the gas outlet port side is higher than that measured by the senor 13*a* at the gas inlet port side, it means that the cause for increase of impurity concentration is involved in the optical system unit 12 of the instrument. If the impurity production is temporary, such impurities will be discharged by continuously flowing the gases 4 and 6. Thus, after it is confirmed through a controller 14 that the impurity concentration as outputted from the sensor 13*b* becomes lower than the predetermined level, the operation of the light source 11 may be re-started. This is convenient in that, by increasing the gas flow rate flowing through the instrument, the impurity concentration in effectively decreased and that the operation of the instrument can be re-started promptly.

An ozone generator 16 may be provided to supply ozones into the optical system unit 12, including optical elements, to wash the optical elements. Alternatively, oxygens may be injected into the optical instrument and light may be projected thereto, by which ozones or activated oxygens may be produced to wash the optical elements therewith. As a washing method, an opto-chemical reaction method may be used wherein light may be projected to the whole inside space of the instrument or wherein an optical catalyst may be used.

As regards the washing process, where sensors are mounted at different locations inside the instrument, the washing process may be performed by the controller 14 only at such location where the concentration becomes higher than the predetermined level.

With the gas flow rate adjustment or the washing process performed by a predetermined time period, the impurity concentration can be decreased. Once it is confirmed through the controller 14 that the impurity concentration as measured by the sensor means 13 is decreased below the predetermined level, the operation of the light source 11 is re-started.

Figure 4:
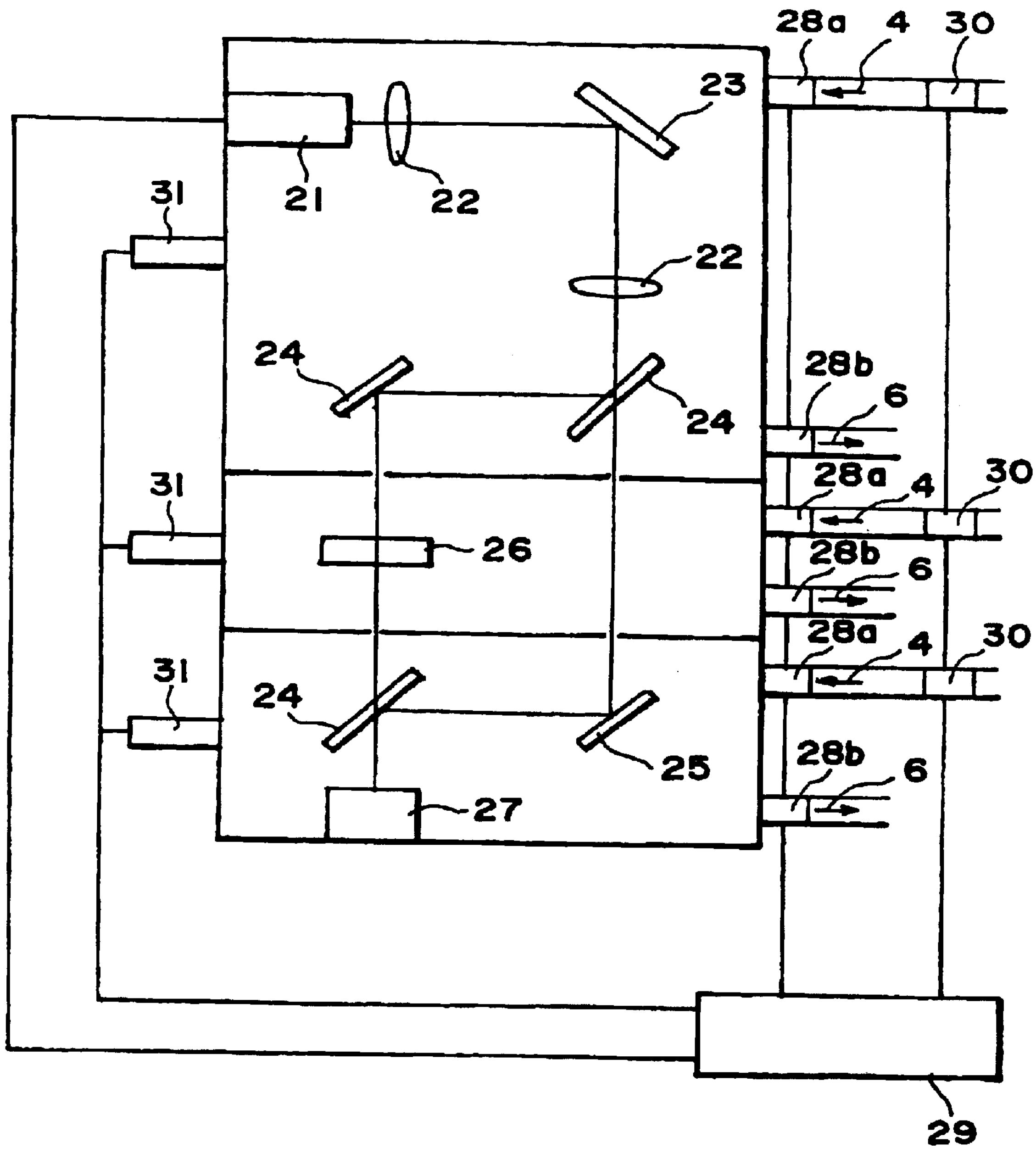
FIG. 4 is a schematic view of an arrangement in an embodiment wherein the present invention is applied to a spectroscopic system.

FIG. 4 shows a general structure in an embodiment wherein the present invention is applied to a spectroscope system. Gases are flown through various portions inside the system, and sensors 28 (28*a* and 28*b*) are mounted to monitor the impurity concentration. The sensor means 28 outputs the impurity concentration in the gas. If the measured concentration becomes higher than a predetermined value, a controller 29 stops a light source and performs the gas flow rate adjustment as well as a washing process using ozones, for example. In this manner, contamination of optical elements inside the system as well as a measurement sample therein is prevented.

A few examples will now be described.

EXAMPLE 1

A quartz parallel plate of a size 30 mm diameter and 3.0 mm thickness was stored in a conventional environment (total organic substance amount of a few tens $\mu g/m^3$), being supplied with a $N_2$ gas. After it was stored therein by one month, the transmission factor with respect to 193 nm, for example, was decreased by about 0.3%. The substances deposited on the surface of the quartz plate having been stored were analyzed by the GC/MS heating desorption method. The results showed that phtalates such as DBP, for example, phenols such as BHT, for example, carboxylic acids such as palmitic acid, for example, as well as amines and ethers were detected.

In consideration of the above, from the environment including the $N_2$ gas line, plastic materials used in phtalates such as DBP or DOP as a plastic agent as well as plastic materials using BHT as an anti-oxidation agent were removed. The concentration each of carboxylic acids, aldehydes, esters, phenols, phtalates, phthalic acids, amines, and amides was kept at 0.01 $\mu g/m^3$ or less, and the total organic substance amount was kept at 1 $\mu g/m^3$ or less. After a quartz plate was kept in such environment for one month, there was no change in transmission factor thereof. Also, according to the analysis based on the GC/MS heating desorption method, no deposition was found on the surface thereof. Thus, deposition of organic substances on the quartz and contamination thereby were prevented effectively.

EXAMPLE 2

Like the quartz plate, a fluorite was examined. In a conventional storage method, the transmission factor with respect to 193 nm was decreased in one month by about 0.3%. As regards surface deposited matters, phtalates and carboxylic acids as well as aldehydes were detected. Where organic substances in a storage environment were controlled in accordance with the conditions set by the present invention, no deterioration of the transmission factor was found. Further, no surface deposition was detected. Thus, satisfactory results were obtained also in regard to fluorite.

EXAMPLE 3

Similar examinations were made to a sample having an anti-reflection coating formed thereon. In a conventional storage method, deterioration of transmission factor was observe. Also, surface depositions were detected. Under the conditions set by the present invention, the transmission factor was kept constant, and no deposition was detected.

It was confirmed that, as long as the organic substance amount was not greater than a predetermined value, circulation of $N_2$ gas through the inside space of the instrument had a sufficient effect to maintain the optical characteristic of an optical element therein.

While the invention has been described with reference to the structures disclosed herein, it is not confined to the details set forth and this application is intended to cover such modifications or changes as may come within the purposes of the improvements or the scope of the following claims.

What is claimed is:

1. An optical instrument, comprising:

an optical element; and a detector for detecting a concentration of airborne impurities in an ambience of a space surrounding the optical element;

ozone supplying means for supplying ozone into the ambience; and cleaning means for cleaning the ambience by use of the ozone supplied by said ozone supplying means, when the impurity concentration detected by said detector is not less than a predetermined value, to suppress deposition of the airborne impurities on the optical element.

2. An optical instrument according to claim 1, further comprising means for putting the ambience in a state purged with a gas substantially not absorbing light to be propagated through the optical element.

3. An optical instrument according to claim 2, wherein the gas is nitrogen or helium.

4. An optical instrument according to claim 2, wherein the light comprises deep ultraviolet rays having a wavelength not longer than 200 nm.

5. An optical instrument according to claim 4, wherein the gas comprises a helium gas.

6. An optical instrument according to claim 3, wherein the light comprises deep ultraviolet rays having a wavelength of about 248 nm.

7. An optical instrument according to claim 1, further comprising means for holding a mask, an illumination optical system for illuminating a pattern of the mask with light from a light source, and means for holding a wafer to be exposed with the pattern of the mask.

8. An optical instrument according to claim 7, wherein said optical element comprises a reflective element only, or combination of a reflective optical element and a refractive optical element.

9. An optical instrument according to claim 1, wherein said detector has a sensor for detecting a concentration of an organic substance.

10. An optical instrument according to claim 9, wherein the concentration of the organic substance is controlled so that the total amount of organic substance in a gas inside said optical instrument becomes not greater than 1 $\mu g/m^3$.

11. An optical instrument according to claim 10, wherein the concentration of the organic substance is controlled so that each concentration of carboxylic acids, aldehydes, esters, phenols, phtalates, phthalic acids, amines, and amides is kept at 0.01 $\mu g/m^3$ or less.

12. A device manufacturing method, comprising the steps of:

exposing a wafer by use of an optical instrument as recited in claim 7; and developing the exposed wafer.

13. An optical instrument, comprising:

a detector for detecting a concentration of airborne impurities in an ambience of a space surrounding an optical element;

oxygen supplying means for supplying oxygen into the ambience; and cleaning means for cleaning the ambience by projecting light to the oxygen supplied by said oxygen supplying means, to produce ozone or active oxygen, when the impurity concentration detected by said detector is not less than a predetermined value, to suppress deposition of the airborne impurities on the optical element.

14. An optical instrument according to claim 13, further comprising means for holding a mask, an illumination optical system for illuminating a pattern of the mask with light from a light source, and means for holding a wafer to be exposed with the pattern of the mask.

15. An optical instrument according to claim 13, wherein said optical instrument includes a reflective optical element only, as said optical element.

16. An optical instrument according to claim 13, wherein said optical instrument includes, as said optical element, a reflective optical element and a refractive optical element.

17. A device manufacturing method, comprising the steps of:

exposing a wafer by use of an optical instrument as recited in claim 13; and developing the exposed wafer.

18. An optical instrument, comprising:

a detector for detecting a concentration of airborne impurities in an ambience of a space surrounding an optical element;

light projecting means for projecting light into the ambience; and cleaning means for cleaning the ambience by generating a photochemical reaction in the ambience by projecting light thereto using said light projecting means, when the impurity concentration detected by said detector is not less than a predetermined value, to suppress deposition of the airborne impurities on the optical element.

19. An optical instrument according to claim 18, further comprising means for holding a mask, an illumination optical system for illuminating a pattern of the mask with light from a light source, and means for holding a wafer to be exposed with the pattern of the mask.

20. An optical instrument according to claim 18, wherein said optical instrument includes a reflective optical element only, as said optical element.

21. An optical instrument according to claim 18, wherein said optical instrument includes, as said optical element, a reflective optical element and a refractive optical element.

22. A device manufacturing method, comprising the steps of:

exposing a wafer by use of an optical instrument as recited in claim 18; and developing the exposed wafer.

23. An optical instrument, comprising:

a detector for detecting a concentration of airborne impurities in an ambience of a space surrounding an optical element; and cleaning means arranged to generate a photochemical reaction by use of a photo-catalyst, thereby to clean the ambience, when the impurity concentration detected by said detector is not less than a predetermined value, to suppress deposition of the airborne impurities on the optical element.

24. An optical instrument according to claim 23, further comprising means for holding a mask, an illumination optical system for illuminating a pattern of the mask with light from a light source, and means for holding a wafer to be exposed with the pattern of the mask.

25. An optical instrument according to claim 23, wherein said optical instrument includes a reflective optical element only, as said optical element.

26. An optical instrument according to claim 23, wherein said optical instrument includes, as said optical element, a reflective optical element and a refractive optical element.

27. A device manufacturing method, comprising the steps of:

exposing a wafer by use of an optical instrument as recited in claim 23; and developing the exposed wafer.

28. An optical instrument according to claim 1, wherein the detector continuously measures the impurity concentration during operation of the optical instrument.

29. An optical instrument according to claim 1, wherein the detector measures the impurity concentration during operation of the optical instrument.

30. An optical instrument according to claim 13, wherein the detector continuously measures the impurity concentration during operation of the optical instrument.

31. An optical instrument according to claim 13, wherein the detector measures the impurity concentration during operation of the optical instrument.

32. An optical instrument according to claim 18, wherein the detector continuously measures the impurity concentration during operation of the optical instrument.

33. An optical instrument according to claim 18, wherein the detector measures the impurity concentration during operation of the optical instrument.

34. An optical instrument according to claim 23, wherein the detector continuously measures the impurity concentration during operation of the optical instrument.

35. An optical instrument according to claim 23, wherein the detector measures the impurity concentration during operation of the optical instrument.

36. An optical instrument, comprising:

an optical element;

a gas inlet port for introducing gas to the optical instrument;

a gas outlet port for exhausting gas from the optical instrument;

a first detector for detecting a concentration of airborne impurities in an ambience of a space surrounding the optical element, the first detector being positioned at the gas outlet port;

ozone supplying means for supplying ozone into the ambience through the gas inlet port; and cleaning means for cleaning the ambience by use of the ozone supplied by the ozone supplying means, when the airborne impurity concentration detected by the first detector is not less than a predetermined value.

37. An optical instrument according to claim 36, further comprising a second detector for detecting a concentration of airborne impurities, the second detector being positioned at the gas inlet port, wherein the cleaning means cleans the ambience by use of the ozone supplied by the ozone supplying means, when the airborne impurity concentration of the ambience of a space surrounding the optical element detected by the first and second detectors is not less than a predetermined value.

38. An optical instrument, comprising:

a gas inlet port for introducing gas to the optical instrument;

a gas outlet port for exhausting gas from the optical instrument;

a first detector for detecting a concentration of airborne impurities in an ambience of a space surrounding an optical element, the first detector being positioned at the gas outlet port;

oxygen supplying means for supplying oxygen into the ambience through the gas inlet port; and cleaning means for cleaning the ambience by projecting light to the oxygen supplied by the oxygen supplying means, to produce ozone or active oxygen, when the impurity concentration detected by the first detector is not less than a predetermined value.

39. An optical instrument according to claim 38, further comprising a second detector for detecting a concentration of airborne impurities, the second detector being positioned at the gas inlet port, wherein the cleaning means cleans the ambience by projecting light to the oxygen supplied by the oxygen supplying means, to produce ozone or active oxygen, when the airborne impurity concentration of the ambience of a space surrounding the optical element detected by the first and second detectors is not less than a predetermined value.

40. An optical instrument, comprising:

a gas inlet port for introducing gas to the optical instrument;

a gas outlet port for exhausting gas from the optical instrument;

a first detector for detecting a concentration of airborne impurities in an ambience of a space surrounding an optical element, the first detector being positioned at the gas outlet port;

light projecting means for projecting light into the ambience; and cleaning means for cleaning the ambience by generating a photochemical reaction in the ambience by projecting light thereto using the light projecting means, when the impurity concentration detected by the first detector is not less than a predetermined value.

41. An optical instrument according to claim 40, further comprising a second detector for detecting a concentration of airborne impurities, the second detector being positioned at the gas inlet port, wherein the cleaning means cleans the ambience by generating a photochemical reaction in the ambience by projecting light thereto using the light projecting means, when the airborne impurity concentration of the ambience of a space, surrounding the optical element detected by the first and second detectors is not less than a predetermined value.

42. An optical instrument, comprising:

a gas inlet port for introducing gas to the optical instrument;

a gas outlet port for exhausting gas from the optical instrument;

a first detector for detecting a concentration of airborne impurities in an ambience of a space surrounding an optical element, the first detector being positioned at the gas outlet port; and cleaning means arranged to generate a photochemical reaction by use of a photo-catalyst, thereby to clean the ambience, when the impurity concentration detected by the first detector is not less than a predetermined value.

43. An optical instrument according to claim 42, further comprising a second detector for detecting a concentration of airborne impurities, the second detector being positioned at the gas inlet port, wherein the cleaning means cleans the ambience by use of a photo catalyst, thereby to clean the ambience, when the airborne impurity concentration of the ambience of a space surrounding the optical element detected by the first and second detectors is not less than a predetermined value.

44. A device manufacturing method, comprising the steps of:

exposing a wafer by use of an optical instrument as recited in claim 36; and developing the exposed wafer.

45. A device manufacturing method, comprising the steps of:

exposing a wafer by use of an optical instrument as recited in claim 38; and developing the exposed wafer.

46. A device manufacturing method, comprising the steps of:

exposing a wafer by use of an optical instrument as recited in claim 40; and developing the exposed wafer.

47. A device manufacturing method, comprising the steps of:

exposing a wafer by use of an optical instrument as recited in claim 42; and the exposed wafer.

* * * * *

UNITED STATES PATENT AND TRADEMARK OFFICE

CERTIFICATE OF CORRECTION

PATENT NO. : 6,740,893 B1 
DATED : May 25, 2004
INVENTOR(S) : Masayuki Tanabe

It is certified that error appears in the above-identified patent and that said Letters Patent is hereby corrected as shown below:

Title page,
Item [56], References Cited, OTHER PUBLICATIONS, after "Edmund Industrial Optics," "Teh" should read -- The --.

Column 4,
Line 65, "flowrate" should read -- flow rate --.

Column 7,
Line 60, "observe." should read -- observed. --.

Column 8,
Line 52, "phtalates" should read -- phthalates, --.

Column 12,
Line 19, "photo catalyst" should read -- photo-catalyst --.
Line 43, "the exposed" should read -- developing the exposed --.

Signed and Sealed this

Thirtieth Day of November, 2004

JON W. DUDAS
*Director of the United States Patent and Trademark Office*